US009163872B2

(12) United States Patent
Fragnito et al.

(10) Patent No.: US 9,163,872 B2
(45) Date of Patent: Oct. 20, 2015

(54) METHOD OF OPERATING A REFRIGERATION SYSTEM FOR A MOBILE CARGO CONTAINER

(75) Inventors: Mark Fragnito, Watkinsville, GA (US); John D. Ward, Jr., Watkinsville, GA (US); Deborah A. Champagne, Syracuse, NY (US)

(73) Assignee: CARRIER CORPORATION, Farmington, CT (US)

(*) Notice: Subject to any disclaimer, the term of this patent is extended or adjusted under 35 U.S.C. 154(b) by 346 days.

(21) Appl. No.: 13/634,375

(22) PCT Filed: May 2, 2011

(86) PCT No.: PCT/US2011/034745
§ 371 (c)(1),
(2), (4) Date: Sep. 12, 2012

(87) PCT Pub. No.: WO2011/146230
PCT Pub. Date: Nov. 24, 2011

(65) Prior Publication Data
US 2013/0055730 A1 Mar. 7, 2013

Related U.S. Application Data

(60) Provisional application No. 61/346,315, filed on May 19, 2010.

(51) Int. Cl.
*B60P 3/20* (2006.01)
*F25D 29/00* (2006.01)
(Continued)

(52) U.S. Cl.
CPC .......... *F25D 29/003* (2013.01); *B60H 1/00014* (2013.01); *B60H 1/3232* (2013.01); *B60P 3/20* (2013.01); *F25B 2600/025* (2013.01);
(Continued)

(58) Field of Classification Search
CPC ........... F25B 2700/2106; F25D 29/003; F25D 2700/02; F25D 2700/14
USPC .................... 62/125–127, 129, 239, 448, 449
See application file for complete search history.

(56) References Cited

U.S. PATENT DOCUMENTS 4,899,549 A 2/1990 Berge et al.
4,903,502 A 2/1990 Hanson et al.
(Continued)

FOREIGN PATENT DOCUMENTS

DE 19831787 A1 1/1999
JP 5288451 A 11/1993
(Continued)

OTHER PUBLICATIONS

International Report on Patentability for PCT Application No. PCT/US2011/034745, dated Nov. 29, 2012, pp. 1-6.
(Continued)

*Primary Examiner* — Jonathan Bradford
(74) *Attorney, Agent, or Firm* — Cantor Colburn LLP

(57) ABSTRACT

A method (80) of operating a refrigeration system (48) for a refrigerated mobile cargo container (2) includes sensing a temperature outside of the refrigerated mobile cargo container (2), detecting a position of a door (16, 18) on the refrigerated mobile cargo container (2), and deactivating the refrigeration system (48) if the door (16, 18) is open and the temperature outside of the refrigerated mobile cargo container (2) is less than a predetermined value.

7 Claims, 2 Drawing Sheets

(51) Int. Cl.
*B60H 1/00* (2006.01)
*B60H 1/32* (2006.01)

(52) U.S. Cl.
CPC ..... *F25B2700/2106* (2013.01); *F25D 2700/02* (2013.01); *F25D 2700/14* (2013.01)

(56) References Cited

U.S. PATENT DOCUMENTS

| | | |
|---|---|---|
| 5,065,587 A | 11/1991 | Howland et al. |
| 5,157,933 A | 10/1992 | Brendel |
| 5,186,015 A * | 2/1993 | Roehrich et al. ............ 62/133 |
| 5,860,594 A | 1/1999 | Reason et al. |
| 5,870,898 A | 2/1999 | Choi |
| 6,027,031 A | 2/2000 | Reason et al. |
| 6,044,651 A | 4/2000 | Reason et al. |
| 6,058,729 A | 5/2000 | Lifson et al. |
| 6,318,100 B1 | 11/2001 | Brendel et al. |
| 6,609,382 B2 * | 8/2003 | Vander Woude et al. ...... 62/50.2 |
| 6,679,074 B2 | 1/2004 | Hanson |
| 2003/0029179 A1 | 2/2003 | Vander Woude et al. |
| 2004/0216469 A1 * | 11/2004 | Viegas et al. ................. 62/50.2 |
| 2006/0279424 A1 | 12/2006 | Yoong |
| 2010/0107661 A1 * | 5/2010 | Awwad et al. .................. 62/80 |

FOREIGN PATENT DOCUMENTS

| | | |
|---|---|---|
| JP | 2007309585 A | 11/2007 |
| WO | 2008094158 A1 | 8/2008 |
| WO | 2011146230 A2 | 11/2011 |
| WO | 2011146230 A3 | 11/2011 |

OTHER PUBLICATIONS

International Search Report and Written Opinion for corresponding PCT Application No. PCT/US2011/034745, dated Feb. 24, 2012, pp. 1-10.

* cited by examiner

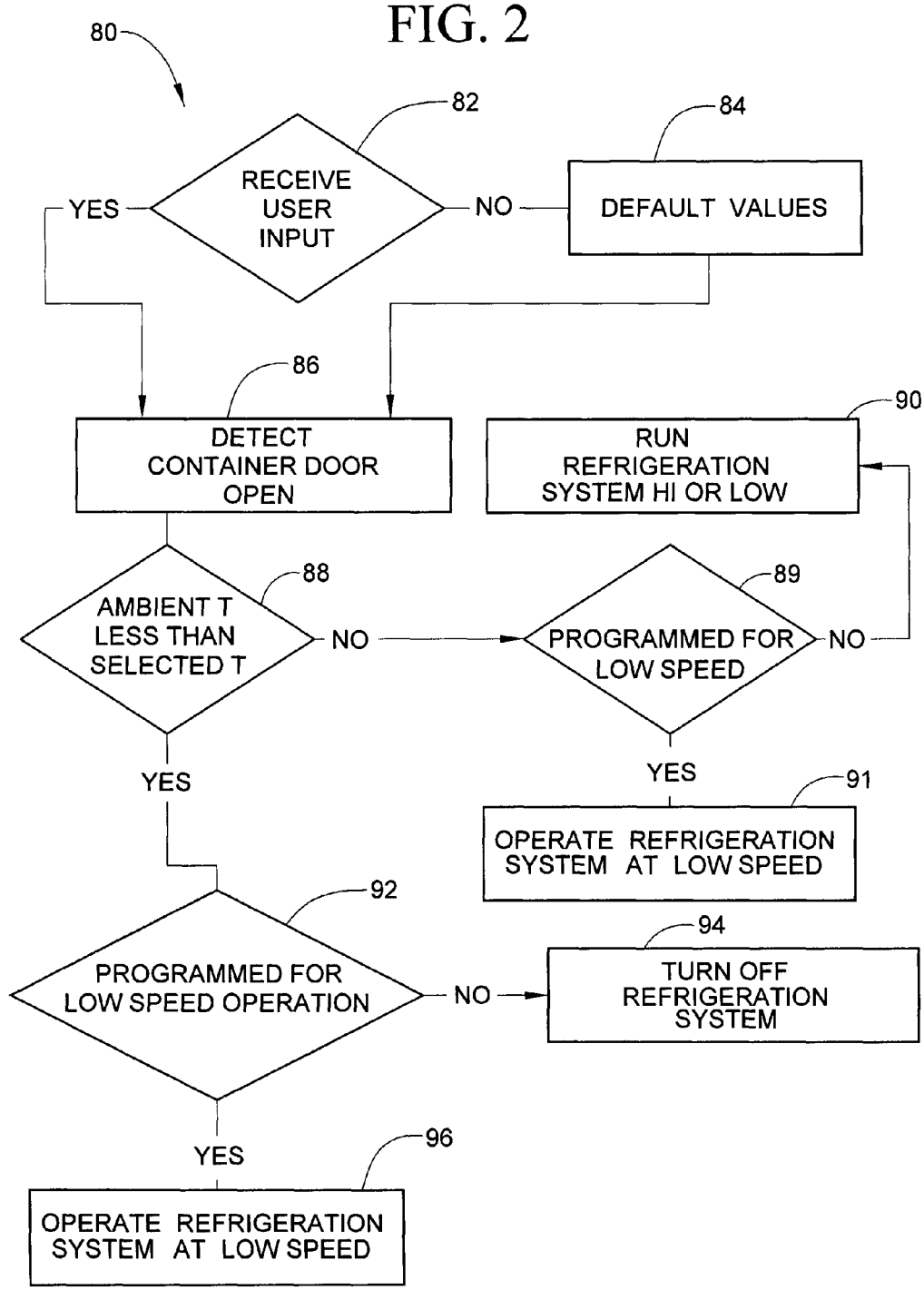

METHOD OF OPERATING A REFRIGERATION SYSTEM FOR A MOBILE CARGO CONTAINER

CROSS REFERENCE TO RELATED APPLICATIONS

This application is a National Stage Application of PCT Application No. PCT/US11/034745, filed May 2, 2011, which claims priority of U.S. Provisional Application Ser. No. 61/346,315, filed May 19, 2010, the disclosure of which is incorporated by reference herein in its entirety.

BACKGROUND OF THE INVENTION

Exemplary embodiments pertain to the art of refrigeration systems and, more particularly, to a refrigeration control system for a mobile cargo container.

Currently, many manufacturers of goods that require refrigeration rely upon carriers to supply refrigerated mobile cargo containers including a refrigeration system to transport the goods to market. The refrigerated mobile cargo containers are parked at the manufacturer and loaded with the goods. Generally, it can take several hours to fully load a refrigerated mobile cargo container before it is ready for shipment. While being loaded, doors on the refrigerated mobile cargo container typically remain open. As such, manufacturers typically require that the refrigeration system remain operational while the refrigerated mobile cargo container is being loaded.

BRIEF DESCRIPTION OF THE INVENTION

Also disclosed is a refrigerated mobile cargo container including a door, a door position sensor configured and disposed to detect a position of the door, a temperature sensor configured and disposed to detect a temperature outside of the refrigerated mobile cargo container, a refrigeration system selectively operable to condition an interior storage zone of the refrigerated mobile cargo container, and a controller operatively coupled to the door position sensor, temperature sensor and the refrigeration system. The controller selectively deactivating the refrigeration system based on inputs from the door position sensor and the temperature sensor.

Also disclosed is a refrigerated mobile cargo container including a door, a door position sensor configured and disposed to detect a position of the door, a temperature sensor configured and disposed to detect a temperature outside of the refrigerated mobile cargo container, a refrigeration system selectively operable to condition an interior storage zone of the refrigerated mobile cargo container, and a controller operatively coupled to the door position sensor, temperature sensor and the refrigeration system. The controller selectively activating the refrigeration system based on inputs from the door position sensor and the temperature sensor.

BRIEF DESCRIPTION OF THE DRAWINGS

The following descriptions should not be considered limiting in any way. With reference to the accompanying drawings, like elements are numbered alike:

FIG. 2 depicts a flow diagram illustrating a method of operating a refrigeration system for the refrigerated mobile cargo container of FIG. 1.

DETAILED DESCRIPTION OF THE INVENTION

Figure 1:
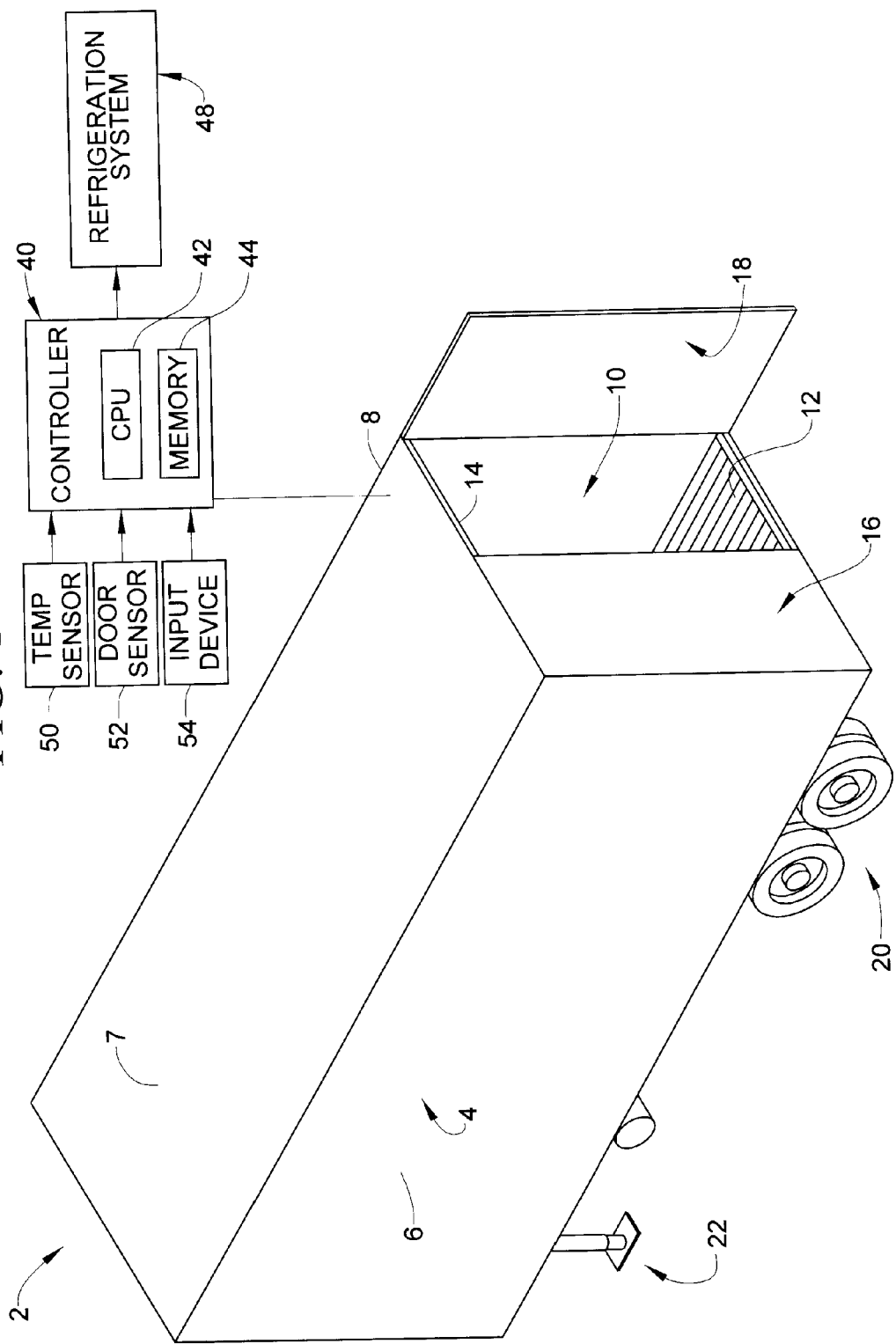
FIG. 1 depicts a refrigerated mobile cargo container in accordance with an exemplary embodiment.

A detailed description of one or more embodiments of the disclosed apparatus and method are presented herein by way of exemplification and not limitation with reference to the Figures.

With reference to FIG. 1, a refrigerated mobile cargo container in accordance with an exemplary embodiment is indicated generally at 2. Refrigerated mobile cargo container 2 includes a body 4 including a plurality of walls 6-8 that define an interior storage zone 10 having a floor 12 and an opening 14. As will be discussed more fully below, interior storage zone 10 is temperature controlled to preserve goods stored therein. Refrigerated mobile cargo container 2 is also shown to include doors 16 and 18 as well as wheels 20 and forward supports 22.

In accordance with an exemplary embodiment, refrigerated mobile cargo container 2 includes a controller 40 having a processor or CPU 42 and a memory 44. Controller 40 is operatively connected to a refrigeration system 48 that is configured to condition internal temperatures of interior storage zone 10. Controller 40 is also operatively connected to a temperature sensor 50 and a door position sensor 52. Temperature sensor 50 is configured to detect ambient temperatures, or temperatures outside of refrigerated mobile cargo container 2. Door position sensor 52 is configured to detect a position of doors 16 and 18. Door position sensor 52 signals controller 40 when doors 16 and/or 18 are in an open position and a closed position. Controller 40 is also shown to be coupled to an input device 54 that is configured to communicate with memory 44. As will be detailed more fully below, input device 54 enables a user to select various options for operating refrigeration system 48.

Reference will now be made to FIG. 2 in describing a method 80 of controlling refrigeration system 48. Initially, a determination is made in block 82 whether user inputs/preferences are received through input device 54. If no inputs are received, default values are set in block 84 and a determination is made in block 86 whether door 16 and/or door 18 is open. If user input is received, any selected preferences are stored in memory 44 and door position determination is made in block 86. If door 16 and/or door 18 is sensed to be open, temperature sensor 50 is polled to determine whether the ambient or outside temperature is below either a default value or a user selected value stored in memory 44 as indicated in block 88. If the ambient temperature is above the default value or user selected value, a determination is made in block 89 whether controller 40 is programmed for low speed operation. If not programmed for low speed operation, controller 40 activates refrigeration system 48 in one of a high speed operation or a low speed operation, as indicated in block 90, dependent upon cooling demand. If programmed for low speed operation, controller 40 activates refrigeration system 48 at low speed as indicated in block 91.

If in block 88 it is determined that the ambient temperature is below the default or user selected value, a determination is made in block 92 whether controller 40 is programmed to operate refrigeration system 48 in a low speed mode. If controller 40 is not programmed to operate refrigeration system 48 in the low speed mode, refrigeration system 48 is shut down as indicated in block 94. If, however, controller 40 is programmed to operate refrigeration system 48 in the low speed mode, refrigeration system 48 is either powered down to low speed operation, or low speed operation is continued if already established as indicated in block 96. In addition to the above, controller 40 is programmed for various delays to avoid repeated cycling of refrigeration system 48 in the event door 16 and/or 18 is repeatedly opened and closed during a short time interval.

At this point it should be understood that the exemplary embodiments provide a system for operating a refrigeration system for a refrigerated mobile cargo container to minimize fuel use and to lower emissions. Refrigeration systems are operated continuously during loading to ensure any goods stored in the interior storage zone remain at or near a desired temperature. However, this continued operation may be costly and result in high emissions as loading may take several hours. Other prior art systems trigger changes in operating parameters of the refrigeration system based on ambient temperature. For example, ambient temperature sensing is used to control operational speed of a compressor. When ambient temperatures are low, the compressor need not work at full capacity. However, during loading, when the doors are open, such systems run continuously, usually at high speed. Continuous operation, regardless of the speed, leads to higher emissions and increased operational costs. The exemplary embodiments cease operation of the refrigeration system during periods when ambient temperatures are at or below desired levels and activate the refrigeration system when ambient temperatures are above the desired levels. In this manner, fuel costs and emissions associated with operation of the refrigeration system during loading of the refrigerated mobile cargo container are minimized.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of operating a refrigeration system for a refrigerated mobile cargo container, the method comprising:
   sensing a temperature outside of the refrigerated mobile cargo container;
   detecting a position of a door on the refrigerated mobile cargo container;
   deactivating the refrigeration system if the door is open and the temperature outside of the refrigerated mobile cargo container is less than a predetermined value; and
   operating the refrigeration system if the door is open and the temperature outside of the refrigerated mobile cargo container is greater than the predetermined value.

2. The method of claim 1, further comprising: activating the refrigeration system at low speed if the door is open, the temperature outside of the refrigerated mobile cargo container is below the predetermined value, and the refrigeration system is programmed for low speed operation.

3. The method of claim 1, further comprising: operating the refrigeration system at a low speed mode if the door is open and the temperature outside of the refrigerated mobile cargo container is greater than the predetermined value.

4. The method of claim 1, further comprising: selectively operating the refrigeration system at one of a high speed and a low speed if the temperature outside of the refrigerated mobile cargo container is greater than the predetermined value.

5. The method of claim 1, further comprising: selectively inputting the predetermined value into a controller operatively connected to the refrigeration system.

6. A refrigerated mobile cargo container comprising:
   a door;
   a door position sensor configured and disposed to detect a position of the at least one door;
   a temperature sensor configured and disposed to detect a temperature outside of the refrigerated mobile cargo container;
   a refrigeration system selectively operable to condition an interior storage zone of the refrigerated mobile cargo container; and
   a controller operatively coupled to the door position sensor, temperature sensor, and the refrigeration system, the controller selectively activating the refrigeration system based on inputs from the door position sensor and the temperature sensor to deactivate the refrigeration system if the door is open and the temperature outside of the refrigerated mobile cargo container is less than a predetermined value, and operate the refrigeration system if the door is open and the temperature outside of the refrigerated mobile cargo container is greater than the predetermined value.

7. The refrigerated mobile cargo container according to claim 6, further comprising: an input device operatively coupled to the controller, the input device facilitating user inputs to the controller.

\* \* \* \* \*